(12) United States Patent
Kohashi

(10) Patent No.: US 7,710,470 B2
(45) Date of Patent: May 4, 2010

(54) IMAGE PROCESSING APPARATUS THAT REDUCES NOISE, IMAGE PROCESSING METHOD THAT REDUCES NOISE, ELECTRONIC CAMERA THAT REDUCES NOISE, AND SCANNER THAT REDUCES NOISE

(75) Inventor: Atsushi Kohashi, Akiruno (JP)

(73) Assignee: Olympus Corporation, Tokyo (JP)

( * ) Notice: Subject to any disclaimer, the term of this patent is extended or adjusted under 35 U.S.C. 154(b) by 1044 days.

(21) Appl. No.: 11/410,076

(22) Filed: Apr. 25, 2006

(65) Prior Publication Data
US 2006/0245008 A1    Nov. 2, 2006

(30) Foreign Application Priority Data
Apr. 28, 2005 (JP) .............................. 2005-131659

(51) Int. Cl.
H04N 5/217  (2006.01)
(52) U.S. Cl. ...................................... 348/241; 348/234
(58) Field of Classification Search ......... 348/241–244, 348/248–252, 234
See application file for complete search history.

(56) References Cited
U.S. PATENT DOCUMENTS
2005/0157189 A1* 7/2005 Sambongi ................... 348/241
2006/0262991 A1* 11/2006 Lee et al. .................... 382/274
2007/0103594 A1* 5/2007 Zhu et al. .................... 348/607
2007/0132865 A1* 6/2007 Adams et al. ............... 348/242

FOREIGN PATENT DOCUMENTS
JP    2001-157057    6/2001
JP    2001-175843    6/2001

* cited by examiner

Primary Examiner—Gevell Selby
(74) Attorney, Agent, or Firm—Westerman, Hattori, Daniels & Adrian, LLP

(57) ABSTRACT

In a noise reduction apparatus or method, at least one of a luminance noise estimate value estimating a luminance noise of a target pixel and a chrominance noise estimate value estimating a chrominance noise of the target pixel is estimated in accordance with an average of luminance signals allocated to a first set of pixels including the target pixel. A noise reduction is performed to a selected one of the luminance noise and the chrominance noise one target pixel by one target pixel based on a corresponding one of a first set of information including the average of luminance signals and the luminance noise estimate value and a second set of information including an average of chrominance signals and the chrominance noise estimate value, the average of chrominance signals being allocated to a second set of pixels including the target pixel.

13 Claims, 9 Drawing Sheets

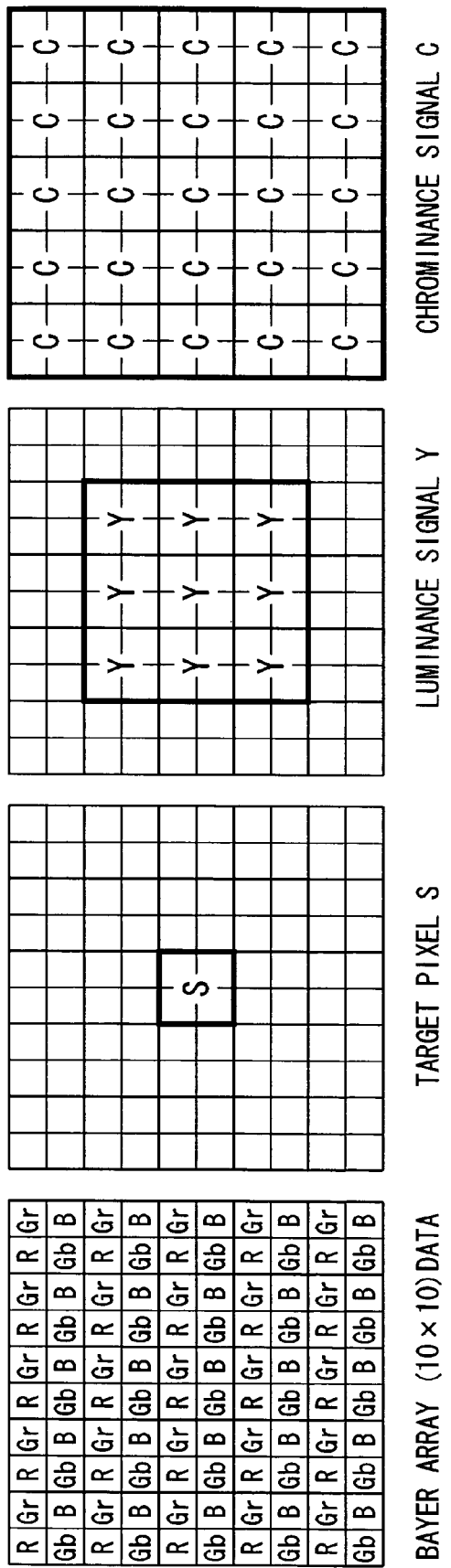

INPUT RGB DATA

FIG. 8B

NOISE-REDUCED LUMINANCE CHROMINANCE DATA

FIG. 8C

NOISE-REDUCED RGB DATA

IMAGE PROCESSING APPARATUS THAT REDUCES NOISE, IMAGE PROCESSING METHOD THAT REDUCES NOISE, ELECTRONIC CAMERA THAT REDUCES NOISE, AND SCANNER THAT REDUCES NOISE

BACKGROUND OF THE INVENTION

1. Field of the Invention

The present invention relates to an image processing apparatus and an image processing method as well as an electronic camera and a scanner, each of which utilizes the image processing apparatus and the image processing method. More specifically, the present invention relates to a noise reduction method or a noise reduction apparatus for reducing a nose of the image.

Priority is claimed on Japanese Patent Application No. 2005-131659, filed Apr. 28, 2005, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

An image processing apparatus generates high quality digital image data from image signals that are obtained by an image pickup element such as a charge coupled device (CCD). Typical examples of the generation of the high quality digital image data is a noise reduction process that reduces a noise included in an image. A noise included in the image may be generated by a variety of causes. Noises caused by an image pickup element are highly influential. Typical examples of the noises caused by the image pickup element include a dark current noise and a shot noise. The dark current noise is generated by heat while the image pickup element does not receive a light.

The dark current noise is almost constant over the position of an image. The dark current noise is superimposed over an ideal image of an object. This superimposition increases brightness of the image. The superimposition may cause "bright black" that has a non-zero black level.

The shot nose is generated by a probabilistic fluctuation that is caused by optoelectric conversion. The shot noise is one of random noises in the image. The quantity of the fluctuation is proportional to a square root of the number of photons. The amount of the shot noise increases as the number of photons increases or as the quality of light incident to the image pickup element increases. For example, when one hundred of the level of the output image signal is obtained by one hundred of the quantity of the incident light, ten of the level of the shot noise may be generated so that the level of the output image signal may vary in a range of 90-110. When the quantity of the incident light is 10000, the level of the shot noise may be 100, so that the level of the output image signal may vary in a range of 9900-10100.

In general, it is more difficult to reduce the shot noise than reducing the dark current noise. The shot noise is in general greater than the dark current noise. The shot noise is more influential to the image than the dark current noise.

As described above, the amount of the shot noise is correlated to the number of photons. The amount of the shot noise depends on not only the intensity of light but also the area of a single pixel of an image pickup element as well as characteristics of optoelectronic conversion of the image pickup element and properties of a color filter. The amount of the shot noise depends on the image pickup element.

Japanese Unexamined Patent Application, First Publication, No. 2001-157057 discloses the following techniques. Constant real numbers a, b, and c are given and a signal level D represents a concentration value. "a", "b", "c" and "d" are used to functionalize the amount of noise N with $N=ab^{cD}$. The amount of noise N to the signal level D is estimated. Characteristics of frequency of filtering are controlled based on the estimated noise N, thereby performing a noise reduction process appropriate to the signal level D.

Japanese Unexamined Patent Application, First Publication, No. 2001-175843 discloses the following techniques. The image signal is divided into a luminance signal and a chrominance signal. A smoothing process is performed to the chrominance signal other than a luminance edge and a color edge, thereby reducing a color noise. As a result, the color noise reduction can be obtained without deterioration of the resolution.

SUMMARY OF THE INVENTION

In accordance with a first aspect of the present invention, an image processing apparatus performing a noise reduction one target pixel by one target pixel comprises: a data generating unit that generates a two dimensional array of image data based on input image data, the two dimensional array of image data being allocated to a first set of pixels that includes a target pixel, the input image data being supplied one pixel by one pixel from an image pickup element; a luminance-chrominance generating unit that generates a plurality of luminance signals and a plurality of chrominance signals based on the two dimensional array of image data; a luminance average calculating unit that calculates, based on the plurality of luminance signals, an average of luminance signals that are allocated to a second set of pixels including the target pixel, the second set of pixels being included in the first set of pixels; a chrominance average calculating unit that calculates, based on the plurality of chrominance signals, an average of chrominance signals that are allocated to a third set of pixels including the target pixel, the third set of pixels being included in the first set of pixels; a noise estimation unit that generates at least one of a luminance noise estimate value and a chrominance noise estimate value in accordance with the average of luminance signals, the luminance noise estimate value estimating a luminance noise of the target pixel, the chrominance noise estimate value estimating a chrominance noise of the target pixel; and a noise reduction unit that performs a noise reduction to the target pixel based on one of first and second sets of information, the first set of information including the average of luminance signals and the luminance noise estimate value, the second set of information including the average of chrominance signals and the chrominance noise estimate value.

In accordance with a second aspect of the present invention, an image processing method for performing a noise reduction one target pixel by one target pixel comprises: generating a two dimensional array of image data based on input image data, the two dimensional array of image data being allocated to a first set of pixels that includes a target pixel, the input image data being supplied one pixel by one pixel from an image pickup element; generating a plurality of luminance signals and a plurality of chrominance signals based on the two dimensional array of image data; calculating, based on the plurality of luminance signals, an average of luminance signals that are allocated to a second set of pixels including the target pixel, the second set of pixels being included in the first set of pixels; calculating, based on the plurality of chrominance signals, an average of chrominance signals that are allocated to a third set of pixels including the target pixel, the third set of pixels being included in the first set of pixels; generating at least one of a luminance noise estimate value and a chrominance noise estimate value in accordance with the average of luminance signals, the luminance noise estimate value estimating a luminance noise of the target pixel, the chrominance noise estimate value estimating a chrominance noise of the target pixel; and performing a noise reduction to the target pixel based on one of first and second sets of information, the first set of information including the average of luminance signals and the luminance noise estimate value, the second set of information including the average of chrominance signals and the chrominance noise estimate value.

In accordance with a third aspect of the present invention, a noise reduction method comprises: estimating at least one of a luminance noise estimate value and a chrominance noise estimate value in accordance with an average of luminance signals, the average of luminance signals being allocated to a first set of pixels including a target pixel, the luminance noise estimate value estimating a luminance noise of the target pixel, the chrominance noise estimate value estimating a chrominance noise of the target pixel; and performing a noise reduction to a selected one of the luminance noise and the chrominance noise one target pixel by one target pixel based on a corresponding one of first and second sets of information, the first set of information including the average of luminance signals and the luminance noise estimate value, the second set of information including an average of chrominance signals and the chrominance noise estimate value, the average of chrominance signals being allocated to a second set of pixels including the target pixel.

In accordance with a fourth aspect of the present invention, a noise reduction apparatus comprises: a noise estimation unit that is adapted to estimate at least one of a luminance noise estimate value and a chrominance noise estimate value in accordance with an average of luminance signals, the average of luminance signals being allocated to a first set of pixels including a target pixel, the luminance noise estimate value estimating a luminance noise of the target pixel, the chrominance noise estimate value estimating a chrominance noise of the target pixel; and a noise reduction unit that is adapted to perform a noise reduction to a selected one of the luminance noise and the chrominance noise one target pixel by one target pixel based on a corresponding one of first and second sets of information, the first set of information including the average of luminance signals and the luminance noise estimate value, the second set of information including an average of chrominance signals and the chrominance noise estimate value, the average of chrominance signals being allocated to a second set of pixels including the target pixel.

In accordance with a fifth aspect of the present invention, an electronic device comprises: an image pickup element; a data generating unit that generates a two dimensional array of image data based on input image data, the two dimensional array of image data being allocated to a first set of pixels that includes a target pixel, the input image data being supplied one pixel by one pixel from the image pickup element; a luminance-chrominance generating unit that generates a plurality of luminance signals and a plurality of chrominance signals based on the two dimensional array of image data; a luminance average calculating unit that calculates, based on the plurality of luminance signals, an average of luminance signals that are allocated to a second set of pixels including the target pixel, the second set of pixels being included in the first set of pixels; a chrominance average calculating unit that calculates, based on the plurality of chrominance signals, an average of chrominance signals that are allocated to a third set of pixels including the target pixel, the third set of pixels being included in the first set of pixels; a noise estimation unit that generates at least one of a luminance noise estimate value and a chrominance noise estimate value in accordance with the average of luminance signals, the luminance noise estimate value estimating a luminance noise of the target pixel, the chrominance noise estimate value estimating a chrominance noise of the target pixel; a noise reduction unit that performs a noise reduction to the target pixel based on one of first and second sets of information, the first set of information including the average of luminance signals and the luminance noise estimate value, the second set of information including the average of chrominance signals and the chrominance noise estimate value; and an output unit that converts a first format of output signal into a second format that is different from the first format, the output signal being an output from the noise reduction unit.

Objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 2A is a view illustrating a Bayer array (10×10) of data in the two dimensional image data;

FIG. 2B is a view illustrating a target pixel S in the two dimensional image data;

FIG. 2C is a view illustrating the luminance signal Y in the two dimensional image data;

FIG. 2D is a view illustrating the chrominance signal C in the two dimensional image data;

FIG. 3A is a view illustrating an array of pixels that receive the image signals from the image pickup element when the left top pixel in the (2×2) pixel bock is "R";

FIG. 3B is a view illustrating an array of pixels that receive the image signals from the image pickup element when the left top pixel in the (2×2) pixel bock is "Gr";

FIG. 3C is a view illustrating an array of pixels that receive the image signals from the image pickup element when the left top pixel in the (2×2) pixel bock is "Gb";

FIG. 3D is a view illustrating an array of pixels that receive the image signals from the image pickup element when the left top pixel in the (2×2) pixel bock is "B";

FIG. 8A is a view illustrating input RGB image data that has not been subjected to the noise reduction;

FIG. 8B is a view illustrating noise reduced luminance chrominance data;

FIG. 8C is a view illustrating noise reduced RNG image data;

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
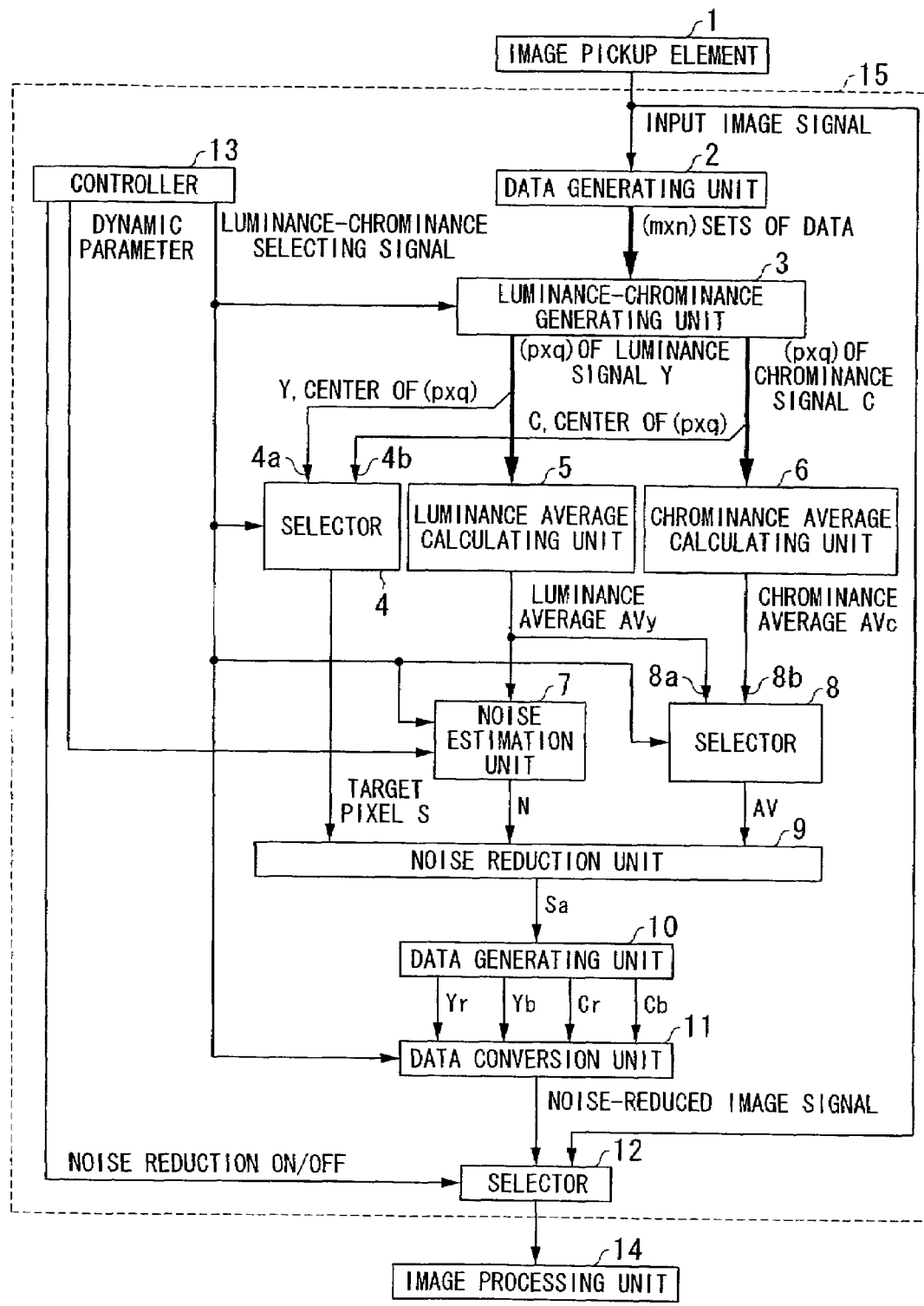
FIG. 1 is a block diagram illustrating a configuration of an image processing apparatus in accordance with an embodiment of the present invention.

FIG. 1 is a block diagram illustrating a configuration of an image processing apparatus in accordance with an embodiment of the present invention. The image processing apparatus may include an image pickup element 1, an image processing unit 14 and a noise reduction device 15. The image pickup element 1 may be an image pickup element that is attached with a single plate of color filter. The image pickup element 1 may be realized by a charge coupled device (CCD) image pickup device or a complementary MOS (CMOS) image pickup device. The image pickup element 1 may include a Bayer array of color filters that include R (Red), Gr (Green on Red Column), Gb (Green on Blue Column), and B (Blue). The image pickup element 1 generates image data of the Bayer array of R, Gr, Gb, and B.

The noise reduction device 15 is adapted to receive the image data from the image pickup element 1 and perform operations of a noise reduction to the image data. The noise reduction device 15 is also adapted to supply the noise-reduced image data to the image processing unit 14. The noise reduction device 15 may include a data generating unit 2, a luminance-chrominance generating unit 3, a selector 4, a luminance average calculating unit 5, a chrominance average calculating unit 6, a noise estimation unit 7, a selector 8, a noise reduction unit 9, a data generating unit 10, a data conversion unit 11, a selector 12, and a controller 13.

The data generating unit 2 is adapted to receive inputs of the image data of the Bayer array of R, Gr, Gb, and B from the image pickup device 1 one pixel by one pixel. The data generating unit 2 is adapted to generate a two dimensional array (p×q) of image data from the Bayer array image data.

The controller 13 is adapted to generate a luminance-chrominance selecting signal in accordance with a color of a left top pixel of a block when the Bayer array image data is converted into luminance chrominance image data. The controller 13 is adapted to supply the luminance-chrominance selecting signal to the luminance-chrominance generating unit 3, the selector 4, the noise estimation unit 7, the selector 8, and the data conversion unit 11. The controller 13 is adapted to supply dynamic parameters to the noise estimation unit 7. The dynamic parameters are related to a temperature of the image pickup device 1, an exposure time and a gain of an analog circuit. The controller 13 is adapted to supply a noise reduction ON/OFF signal to the selector 12.

The luminance-chrominance generating unit 3 is adapted to convert or transform the image data of the Bayer array (m×n) into a two-dimensional array (p×q) of chrominance signal data Cr and Cb and anther two-dimensional array (p×q) of luminance signal data Y. The image data of the Bayer array (m×n) is supplied from the data generating unit 2. The luminance-chrominance generating unit 3 is adapted to receive the luminance-chrominance selecting signal from the controller 13. The luminance-chrominance generating unit 3 generates the two-dimensional array (p×q) of chrominance signal data and the two-dimensional array (p×q) of luminance signal data in accordance with the luminance-chrominance selecting signal.

The selector 4 is adapted to receive a luminance signal and a chrominance signal. The luminance signal is positioned at a center of the two-dimensional array (p×q) of luminance signal data. The chrominance signal is positioned at a center of the two-dimensional array (p×q) of chrominance signal data. The selector 4 is adapted to select and output one of the luminance signal and the chrominance signal of a target pixel S. The selector 4 is adapted to receive the luminance-chrominance selecting signal that is supplied from the controller 13. The selector 4 selects one of the luminance signal and the chrominance signal of a target pixel S in accordance with the luminance-chrominance selecting signal.

The luminance average calculating unit 5 calculates an average of the luminance signal by using plural sets of the luminance signal data. The plural sets of the luminance signal data are selected from (p×q) of the luminance signal data that have been generated by the luminance-chrominance generating unit 3.

The chrominance average calculating unit 5 is adapted top calculate an average of the chrominance signal by using plural sets of the chrominance signal data. The plural sets of the chrominance signal data are selected from (p×q) of the chrominance signal data that have been generated by the luminance-chrominance generating unit 3.

The noise estimation unit 7 is adapted to estimate a noise estimate value of the luminance signal Y, another noise estimate value of the chrominance signal Cr, and still another noise estimate value of the chrominance signal Cb. The noise estimation unit 7 is adapted to receive the luminance-chrominance selecting signal from the controller 13.

The noise estimation unit 7 is adapted to select or output the noise estimate value of the luminance signal Y, the noise estimate value of the chrominance signal Cr, and the noise estimate value of the chrominance signal Cb. The noise estimation unit 7 is capable of correcting the noise estimate values by using the dynamic parameters which are related to the temperature of the image pickup device 1, the exposure time and the gain of the analog circuit.

The selector 8 is adapted to select and output one of the average of the luminance signal that was calculated by the luminance average calculating unit 5 and the other average of the chrominance signal that was calculated by the chrominance average calculating unit 6. The selector 8 is adapted to receive the luminance-chrominance selecting signal from the controller 13. The selector 8 is adapted to select one of the average of the luminance signal that and the average of the chrominance signal in accordance with the luminance-chrominance selecting signal.

The noise reduction unit 9 is adapted to receive the selected one of the luminance signal and the chrominance signal from the selector 4, wherein the luminance signal is positioned at the center of the two-dimensional array (p×q) of luminance signal data and the chrominance signal is positioned at the center of the two-dimensional array (p×q) of chrominance signal data. The noise reduction unit 9 is also adapted to receive the selected one of the average of the luminance signal and the average of the chrominance signal from the selector 8.

The noise reduction unit 9 is also adapted to receive the noise estimate value of the luminance signal and the noise estimate value of the chrominance signal which are selectively transmitted from the noise estimation unit 7. The noise reduction unit 9 is further adapted to selectively perform, one pixel by one pixel, a noise reduction process to the luminance signal and another noise reduction process to the chrominance signal, based on the noise estimate value of the luminance signal and the noise estimate value of the chrominance signal.

The data generating unit 10 is adapted to receive the noise-reduced image data for the luminance signal and the noise reduced image data for the chrominance signal from the noise reduction unit 9 one pixel by one pixel. The data generating unit 10 is adapted to generate a two-dimensional array of image data that includes the luminance signal and the chrominance signal.

The data conversion unit 11 is adapted to receive, from the data generating unit 10, the two-dimensional array of image data including the luminance signal and the chrominance signal. The data conversion unit 11 is adapted to convert or transform the two-dimensional array of image data including the luminance signal and the chrominance signal into a color space signal in the same color space or the RBG Bayer array as the signal that is outputted from the image pickup element 1. The image pickup element 1 outputs the Bayer array of image data. Namely, the data conversion unit 11 converts the image data related to the luminance and the chrominance into image data of the RGB Bayer array which is similar to the Bayer array image data from the image pickup element 1.

The selector 12 is adapted to select one of the output from the data conversion unit 11 and the output from the image pickup element 1. The selector 12 performs the selection based on whether or not the noise reduction process is performed. If the noise reduction process is performed, then the selector 12 receives the noise reduction ON signal from the controller 13 so that the selector 12 selects the noise reduced image data that are transmitted from the data conversion unit 11. If the noise reduction process is not performed, then the selector 12 receives the noise reduction OFF signal from the controller 13 so that the selector 12 selects the image data that are transmitted from the image pickup element 1.

The image processing unit 14 is adapted to receive the noise reduced image data from the noise reduction device 15. The image processing unit 14 is adapted to perform processes for the image data other than the noise reduction process such as a color correction, a brightness correction and resolution compensation.

Descriptions will be made of operations of the image processing apparatus of FIG. 1 in accordance with the present invention. An optical image of an object is subjected to an optoelectronic conversion that is performed by the image pickup device 1. The Bayer data of R, Gr, B, and Gb is outputted from the image pickup element 1. The image data is subjected to an analog-to-digital conversion (A/D conversion) into digital image data. The digital image data is then transmitted to the data generating unit 2 one pixel by one pixel.

The image data that has been inputted one pixel by one pixel is converted by the data generating unit 2 into the two dimensional array (m×n) of image data. The two dimensional array (m×n) of image data is transmitted to the luminance-chrominance generating unit 3. The two dimensional array (m×n) of image data is converted y the luminance-chrominance generating unit 3 into the two dimensional array (m×n) of the image data that include the luminance signal and the chrominance signal. This conversion will be described with reference to FIGS. 2A-2D.

FIG. 2A is a view illustrating a Bayer array (10×10) of data in the two dimensional image data. FIG. 2B is a view illustrating the target pixel S in the two dimensional image data. FIG. 2C is a view illustrating the luminance signal Y in the two dimensional image data. FIG. 2D is a view illustrating the chrominance signal C in the two dimensional image data. The Bayer array of the image data is outputted from the image pickup element 1. In case of m=n=10, the data generating unit 2 generates a two dimensional Bayer array (10 vertical pixels×10 horizontal pixels) of image data as shown in FIG. 2A.

The Bayer array (10×10) of the image data is converted into the image data related to the luminance and chrominance by dividing the Bayer array (10×10) of the image data into a plurality of (2×2) pixel bocks, one of which is illustrated and marked by "S" and encompassed by the broad real line. The (10×10) pixel array is divided into 25(p=5×q=5) blocks of the (2×2) pixel bocks, where p=q=5. For each (2×2) pixel bock, a combination of a set of luminance data with another set of luminance data is generated.

Figures 3A, 3B, 3C, 3D:
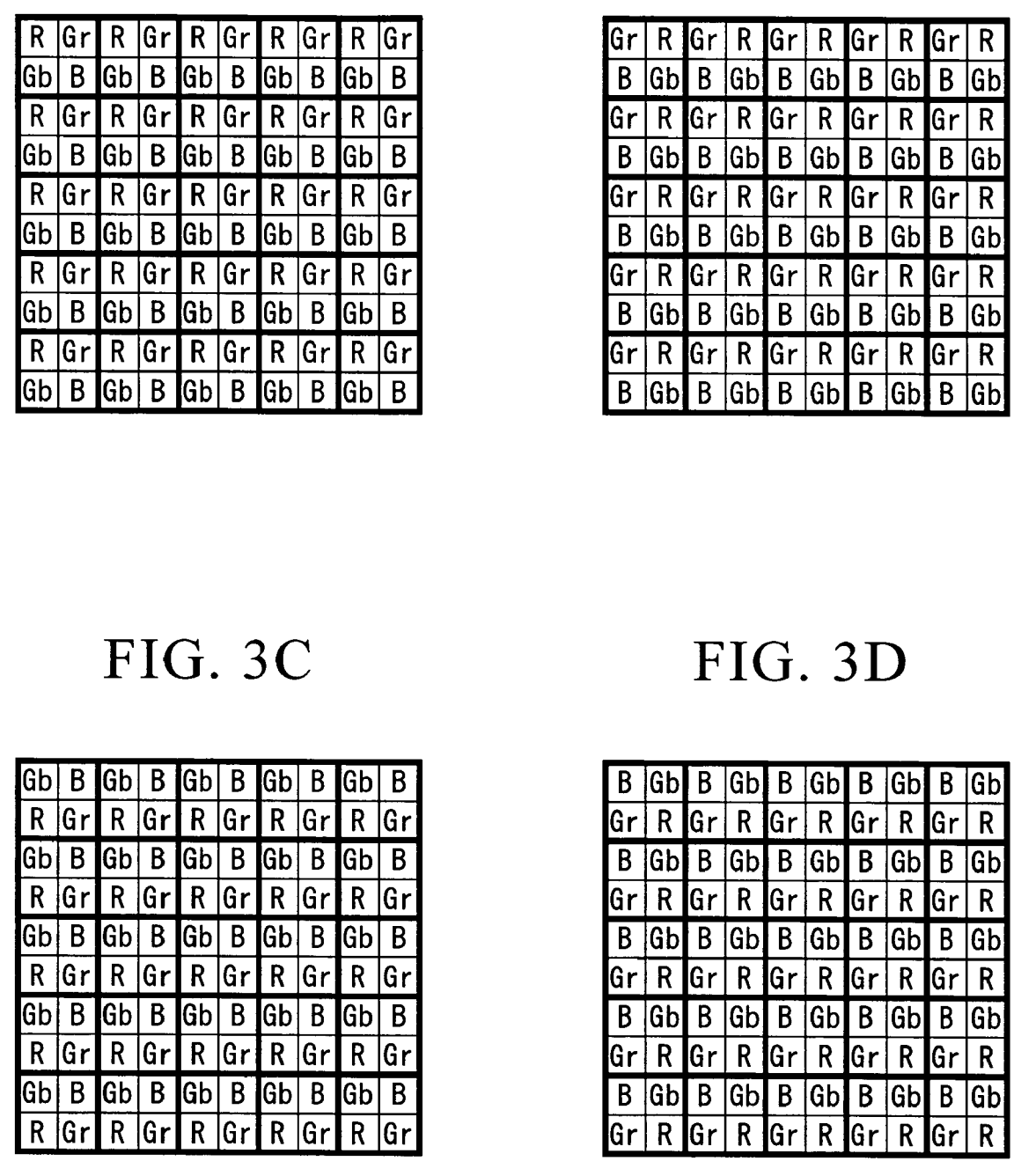

FIG. 2A illustrates data arrays when the left top pixel of the (2×2) pixel bock is R (Red) and the Bayer array of the image data is converted into the image data related to the luminance and chrominance. Difference in input timing of the image data differentiates the color of the left top pixel of the pixel bock. FIG. 3A is a view illustrating an array of pixels that receive the image signals from the image pickup element when the left top pixel in the (2×2) pixel bock is "R". FIG. 3B is a view illustrating an array of pixels that receive the image signals from the image pickup element when the left top pixel in the (2×2) pixel bock is "Gr". FIG. 3C is a view illustrating an array of pixels that receive the image signals from the image pickup element when the left top pixel in the (2×2) pixel bock is "Gb". FIG. 3D is a view illustrating an array of pixels that receive the image signals from the image pickup element when the left top pixel in the (2×2) pixel bock is "B".

The method of conversion of the Bayer array of image data into the image data related to the luminance and chrominance is not limited. The conversion may be made using the following general formula (1). In another case, the conversion may be made using G signal, instead of the luminance data, in order to simplify the necessary operations. When the image pickup element 1 is attached with a complementary color filter, the general conversion formula to the luminance and chrominance signals may be used.

$$\begin{cases} Y = 0.299 \times R + 0.587 \times G + 0.114 \times B \\ C = Cb = -0.169 \times R - 0.331 \times G + 0.500 \times \\ \quad B(\text{LEFT TOP PIXEL IS } B) \\ C = Cr = 0.500 \times R - 0.419 \times G - 0.081 \times \\ \quad B(\text{LEFT TOP PIXEL IS } R) \text{ WHERE} \\ G = (Gr + Gb)/2 \end{cases} \quad (1)$$

In the formula (1), the chrominance signal is represented by "C". The chrominance signal "C" may be Cr in a case and Cb in another case. The color of the left top pixel of the (2×2) pixel bock determines whether the chrominance signal C is Cr or Cb. Shown on the following Table 1 is a relationship of the color of the left top pixel of the (2×2) pixel bock and whether the chrominance signal C is Cr or Cb.

TABLE 1

| LEFT TOP PIXEL | CHROMINANCE SIGNAL C |
| --- | --- |
| R | Cr |
| Gr | — |
| Gb | — |
| B | Cb |

The luminance signal Y and the chrominance signal C are generated as shown in FIGS. 2C and 2D. The center (2×2) pixel bock block in the (5×5) block array is processed as the target pixel "S".

In FIG. 1, the (p×q) luminance signal is transmitted from the luminance-chrominance generating unit 3 to the luminance average calculating unit 5. The (p×q) chrominance signal is transmitted from the luminance-chrominance generating unit 3 to the chrominance average calculating unit 6. The luminance signal and the chrominance signal are transmitted to the selector 4. The luminance signal is positioned at the center of the two-dimensional array (p×q) of luminance signal data. The chrominance signal is positioned at the center of the two-dimensional array (p×q) of luminance signal data.

One of the luminance signal and the chrominance signal is selected and outputted as the target pixel "S" by the selector 4. The luminance signal is positioned at the center of the two-dimensional array (p×q) of luminance signal data. The chrominance signal is positioned at the center of the two-dimensional array (p×q) of luminance signal data. The selector 4 performs the selection operation based on the luminance-chrominance selecting signal that is transmitted from the controller 13. Table 2 shows a relationship between the color of the left top pixel of the (2×2) pixel bock and a selected one of the luminance signal and the chrominance signal of the target pixel "S".

TABLE 2

| LEFT TOP PIXEL | S |
| --- | --- |
| R | Cr |
| Gr | Y |
| Gb | Y |
| B | Cb |

As shown in FIG. 3A, when the left top pixel of the (2×2) pixel bock is R, the selector 4 selects a port 4b thereof so that the selector 4 selects the chrominance signal C (Cr) which is positioned at the center of the two dimensional array (p×q) of chrominance signal data for the target pixel "S". As shown in FIG. 3B, when the left top pixel of the (2×2) pixel bock is Gr, the selector 4 selects another port 4a thereof so that the selector 4 selects the luminance signal Y which is positioned at the center of the two dimensional array (p×q) of luminance signal data for the target pixel "S". As shown in FIG. 3C, when the left top pixel of the (2×2) pixel bock is Gb, the selector 4 selects the port 4a thereof so that the selector 4 selects the luminance signal Y which is positioned at the center of the two dimensional array (p×q) of luminance signal data for the target pixel "S". As shown in FIG. 3D, when the left top pixel of the (2×2) pixel bock is B, the selector 4 selects the port 4b thereof so that the selector 4 selects the chrominance signal C (Cb) which is positioned at the center of the two dimensional array (p×q) of chrominance signal data for the target pixel "S".

The luminance average calculating unit 5 calculates an average value AVy of the luminance signal Y. In this embodiment of the present invention, as shown in FIG. 2C, nine luminance signals may be used to calculate the average value AVy. The nine luminance signals consists of a luminance signal allocated to the target pixel "S" and eight luminance signals allocated to the eight pixels that are adjacent to the target pixel "S". The average calculation may be a simple average or a weighted average weighting each of the luminance signals.

The chrominance average calculating unit 6 calculates an average value AVc of the luminance signal C. In this embodiment of the present invention, as shown in FIG. 2D, twenty five chrominance signals may be used to calculate the average value AVc. The average calculation may be a simple average or a weighted average weighting each of the chrominance signals.

Outputted as the noise reduced image signals are the average value AVy calculated by the luminance average calculating unit 5 and the average value AVc calculated by the chrominance average calculating unit 6. In other words, averaging the image signals that are allocated to the adjacent pixels would functionalize a low pass filter that reduces the noise.

The area covering the pixels that are used to calculate the average value determines the degree of the reduction of the noise. For example, if the average is calculated from a large area, then a high noise reduction can be obtained while graduating or smoothing the image of the object with a blur of image. In contrast, if the average is calculated from a small area, then a low noise reduction can be obtained while keeping a sharp image with abrupt edges thereof. The area from which the luminance average is calculated by the luminance average calculating unit 5 and the other area from which the chrominance average is calculated by the chrominance average calculating unit 6 may preferably be determined taking into account the above relationship.

In general, the blur of the chrominance signal is poorly discriminative as compared to the blur of the luminance signal. Preferably, the average of the luminance signal may be calculated from the small area in order to reduce the blur of the image, but the average of the chrominance signal may be calculated from the large area in order to reduce the noise effectively.

In this embodiment, the area from which the luminance signal is calculated is set as shown in FIG. 2C so that the average of the luminance signal is obtained from the nine luminance signals that consists of one luminance signal allocated to the target pixel "S" and eight luminance signals allocated to eight pixels that are adjacent to the target pixel "S" so as to ensure a high quality of the image. The area from which the chrominance signal is calculated is set as shown in FIG. 2D so that the average of the chrominance signal is obtained from the twenty five chrominance signals so as to ensure a highly effective noise reduction.

Examples of the areas from which the luminance average and the chrominance average are calculated are not limited to the above. For example, twenty five luminance signals may be used to calculate the average AVy of the luminance signals.

The average AVy of the luminance signals that has been calculated by the luminance average calculating unit 5 is transmitted to the noise estimation unit 7. The noise estimation unit 7 estimates a noise estimate value N for the target pixel "S" based on the average AVy of the luminance signals.

In accordance with the embodiment of the present invention, the noise estimation unit 7 is adapted to calculate one pixel by one pixel the noise estimate of the luminance signal Y, the noise estimate of the chrominance signal Cr and the noise estimate of the chrominance signal Cb. The noise estimation unit 7 will be described below.

Figure 4:
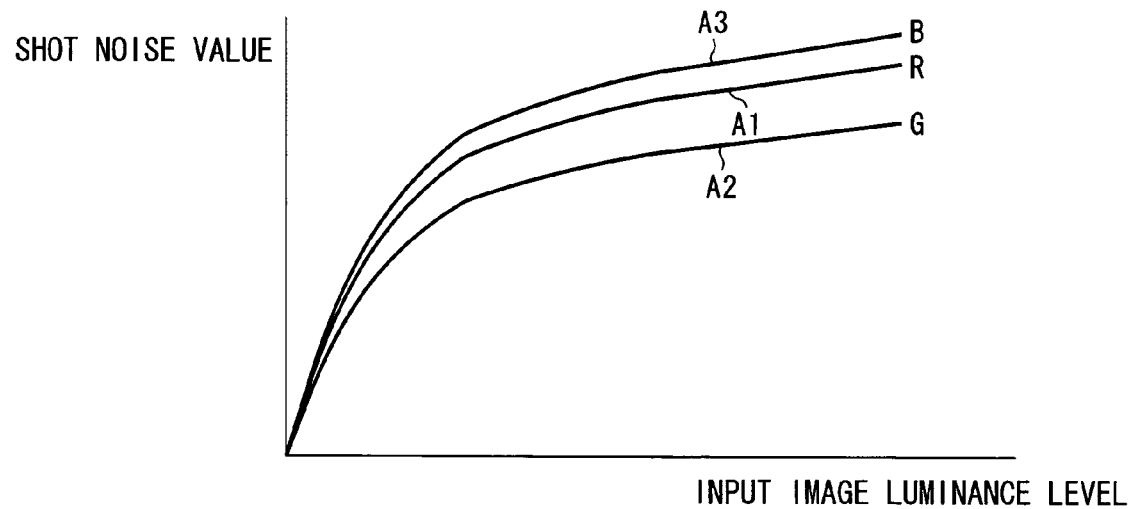
FIG. 4 is a view illustrating variations of shot noise values against luminance levels of an input image signal of each color filter.

FIG. 4 is a view illustrating variations of shot noise values against luminance levels of the input image signal of each color filter. In FIG. 4, the horizontal axis represents the luminance levels of the input image signal and the vertical axis represents the shot noise values. Namely, FIG. 4 shows a relationship of the amount of shot noise versus the quantity of incident light for each color filter of an image pickup element, wherein the shot noise and the incident light are measured by the inventors of the present application. As described above, the amount of shot noise increases as the quantity of incident light increases. The amount of shot noise may vary depending on the intensity of light, the area of each pixel of the image pickup element, the performances of an optoelectronic converter of the image pickup element, and properties of color filters thereof. A characteristic curve "A1" represents measured noise values of the R signal. A characteristic curve "A2" represents measured noise values of the G signal. A characteristic curve "A3" represents measured noise values of the B signal. As shown in FIG. 4, the shot noise value increases as the intensity of the incident light increases. For example, the shot noise value increases as the luminance levels of the input image signal increases. The relationship between the luminance levels of the input image signal and the shot noise depends on the property of each of the RGB color filters.

Figure 5:
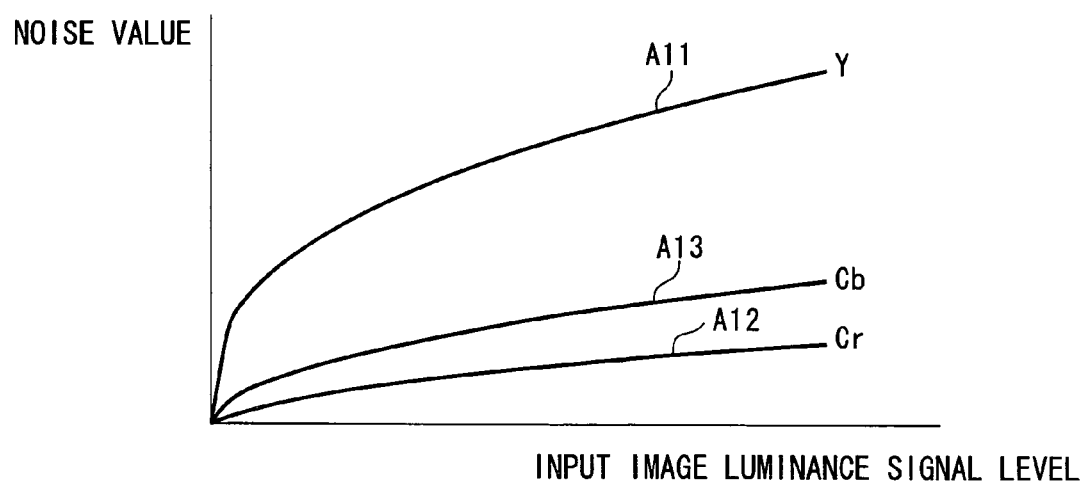
FIG. 5 is a view illustrating variations of noise values against luminance signal levels of an input image.

FIG. 5 is a view illustrating variations of noise values against luminance signal levels of the input image. In FIG. 5, the horizontal axis represents the luminance signal levels of the input image and the vertical axis represents the noise values. Namely, FIG. 5 shows a relationship between the noise values of the luminance signal and the noise values of the chrominance signal. The relationship is converted by using the above described formula (1) from a relationship between the shot noise values and the luminance levels of the input image signal of each color filter shown in FIG. 4. A characteristic curve "A11" represents the noise values of the luminance signal Y. A characteristic curve "A12" represents the noise values of the chrominance signal Cr. A characteristic curve "A13" represents the noise values of the chrominance signal Cb. The conversion from R, G, and B noise values to the Y, Cr, and Cb noise values is made using the above described formula (1). The R, G, and B noise values are different from the Y, Cr, and Cb noise values. Profiles of the R, G, and B noise values are similar to profiles of the Y, Cr, and Cb noise values.

The noise value of the luminance signal Y, the noise value of the chrominance signal Cr and the noise value of the chrominance signal Cb can be obtained based on the luminance signal levels of the input image with reference to the characteristics shown in FIG. 5. The average value AVy of the luminance signal is transmitted from the luminance average calculating unit 5 to the noise estimation unit 7. The luminance-chrominance selecting signal is also transmitted from the controller 13 to the noise estimation unit 7. The noise value of the luminance signal Y, the noise value of the chrominance signal Cr and the noise value of the chrominance signal Cb are estimated by the noise estimation unit 7 based on the average value AVy of the luminance signal that is transmitted from the luminance average calculating unit 5. One of the noise value of the luminance signal Y, the noise value of the chrominance signal Cr and the noise value of the chrominance signal Cb is selected by the noise estimation unit 7 based on the luminance-chrominance selecting signal that is outputted from the controller 13 so that the selected one is outputted as a noise estimate value N from the noise estimation unit 7.

A relationship between the noise estimate value N that is outputted from the noise estimation unit 7 and the color of the left top pixel of the pixel block is shown on the following table 3.

TABLE 3

| LEFT TOP PIXEL | N |
|---|---|
| R | NOISE VALUE OF Cr |
| Gr | NOISE VALUE OF Y |
| Gb | NOISE VALUE OF Y |
| B | NOISE VALUE OF Cb |

When the color of the left top pixel of the pixel block is R shown in FIG. 3A, the noise value of the chrominance signal Cr is selected and outputted from the noise estimation unit 7. When the color of the left top pixel of the pixel block is Gr shown in FIG. 3B, the noise value of the luminance signal Y is selected and outputted from the noise estimation unit 7. When the color of the left top pixel of the pixel block is B shown in FIG. 3D, the noise value of the chrominance signal Cb is selected and outputted from the noise estimation unit 7.

Figure 6:
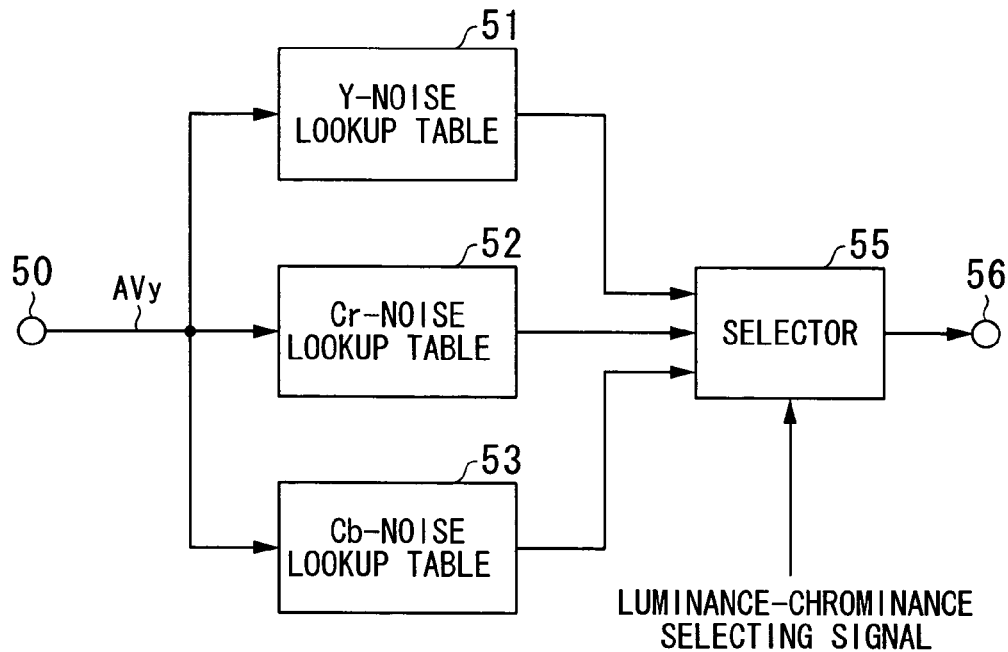
FIG. 6 is a block diagram illustrating an example of a configuration of a noise estimation unit shown in FIG. 1.

FIG. 6 is a block diagram illustrating an example of a configuration of the noise estimation unit 7. The noise estimation unit 7 may include a Y-noise lookup table 51, a Cr-noise lookup table 52, a Cb-noise lookup table 53, a selector 55, an input terminal 50 and an output terminal 56. In FIG. 6, the Y-noise lookup table 51, the Cr-noise lookup table 52, and the Cb-noise lookup table 53 can be realized by read only memories (ROMs), for example. The Y-noise lookup table 51 stores the noise value of the luminance signal Y against the luminance signal levels of the input image, based on the characteristic curve "A11" shown in FIG. 5. The Cr-noise lookup table 52 stores the noise value of the chrominance signal Cr against the luminance signal levels of the input image, based on the characteristic curve "A12" shown in FIG. 5. The Cb-noise lookup table 53 stores the noise value of the chrominance signal Cb against the luminance signal levels of the input image based on the characteristic curve. "A13" shown in FIG. 5.

The input terminal 50 receives the average value AVy of the luminance signal from the luminance average calculating unit 5. The average value AVy of the luminance signal is supplied as addresses of the Y-noise lookup table 51, the Cr-noise lookup table 52, and the Cb-noise lookup table 53. The noise value of the luminance signal Y, the noise value of the chrominance signal Cr and the noise value of the chrominance signal Cb are outputted from the the Y-noise lookup table 51, the Cr-noise lookup table 52, and the Cb-noise lookup table 53, respectively. The noise values of the luminance signal Y, the noise value of the chrominance signal Cr and the noise value of the chrominance signal Cb are supplied to the selector 55.

The luminance-chrominance selecting signal is supplied from the controller 13 to the selector 55. The selector 55 performs selecting operations in accordance with the luminance-chrominance selecting signal. The selector 55 selects one of the noise value of the luminance signal Y, the noise value of the chrominance signal Cr and the noise value of the chrominance signal Cb so that the output terminal 56 outputs the selected one as the noise estimate value.

Figure 7:
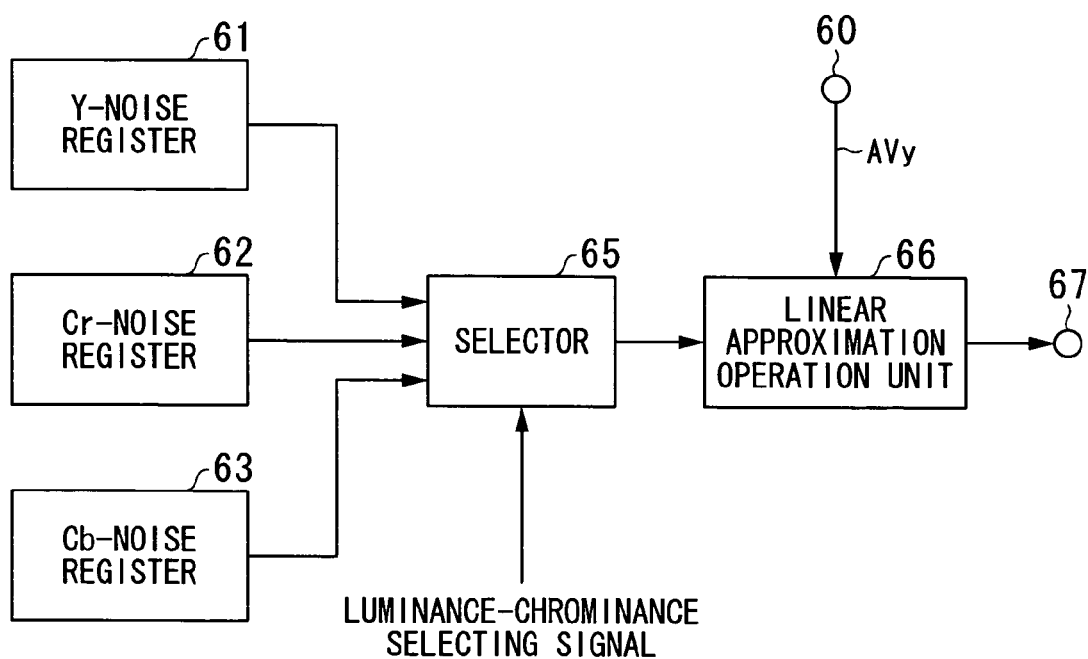
FIG. 7 is a block diagram illustrating another example of the configuration of a noise estimation unit shown in FIG. 1.

FIG. 7 is a block diagram illustrating another example of the configuration of the noise estimation unit 7. The noise estimation unit 7 may include a Y-noise parameter register 61, a Cr-noise parameter register 62, a Cb-noise parameter register 63, a selector 65, a linear approximation operation unit 66, an input terminal 60 and an output terminal 67.

In accordance with the above-described configuration of the noise estimation unit 7 shown in FIG. 6, the noise characteristics shown in FIG. 5 are stored in the Y-noise lookup table 51, the Cr-noise lookup table 52, and the Cb-noise lookup table 53 so as to obtain the noise value against the luminance signal level of the input image. In contrast, the noise estimation unit 7 performs the linear approximation.

In FIG. 7, the Y-noise parameter register 61 stores parameters that need to be used to perform the linear approximation of the noise value of the luminance signal Y against the luminance signal level of the input image based on the characteristic curve "A11" shown in FIG. 5. The Cr-noise parameter register 62 stores parameters that need to be used to perform the linear approximation of the noise value of the chrominance signal Cr against the luminance signal level of the input image based on the characteristic curve "A12" shown in FIG. 5. The Cb-noise parameter register 63 stores parameters that need to be used to perform the linear approximation of the noise value of the chrominance signal Cb against the luminance signal level of the input image based on the characteristic curve "A13" shown in FIG. 5. Those parameters may be obtained by dividing each of the noise characteristic curves of FIG. 5.

The Y-noise parameter register 61, the Cr-noise parameter register 62, and the Cb-noise parameter register 63 supply the parameters to the selector 65. The controller 13 supplies the luminance-chrominance selecting signal to the selector 65. The selector 65 performs selecting operations in accordance with the luminance-chrominance selecting signal. In accordance with the luminance-chrominance selecting signal, the selector 65 selects one of a first set of parameters that need to obtain the noise values of the luminance signals Y, a second set of parameters that need to obtain the noise values of the chrominance signals Cr and a third set of parameters need to obtain the noise values of the chrominance signals Cb. The selector 65 supplies a selected one of the first to third sets to the linear approximation operation unit 66.

The linear approximation operation unit 66 receives the average value AVy of the luminance signal from the input terminal 60. The linear approximation operation unit 66 performs, as the linear approximation, linear interpolation operations to the noise values of the luminance signals Y, the noise values of the chrominance signals Cr and the noise values of the chrominance signals Cb against the average value of the luminance signal of the input image. The linear-approximated noise value is outputted from the output terminal 67.

The above descriptions have been made assuming that the noise characteristics are static characteristics measured under specific conditions. The noise characteristics should not be limited to the above. It is possible for the noise estimation unit 7 to further include a correcting unit that corrects or adjusts the static characteristics with reference to the dynamic parameters that are supplied from the controller 13. The dynamic parameters may include, but are not limited to, a temperature of the image pickup device 1, an exposure time and a gain of an analog circuit. The dynamic parameters are transmitted from the controller 13 to the noise estimation unit 7.

Table 4 shows a relationship between the dynamic parameters and the amount of shot noise generated. The terms "much" and "small" representing the amount of the shot noise are relative values to the noise amount as stored. The noise estimation unit 7 further includes the correction unit that may calculate the product of a gain and the noise characteristics so as to correct or compensate the noise estimate values. The gain depends on the dynamic parameters. The correction unit may also calculate the addition of the gain and the noise characteristics so as to correct or compensate the noise estimate values. The correction unit may also calculate the subtraction of the gain from the noise characteristics so as to correct or compensate the noise estimate values.

TABLE 4

| DYNAMIC PARAMETER | TEMPERATURE OF IMAGE PICKUP ELEMENT | | EXPOSURE TIME | | ANALOG GAIN | |
| --- | --- | --- | --- | --- | --- | --- |
| | HIGH | LOW | LONG | SHORT | HIGH | LOW |
| AMOUNT OF SHOT NOISE | MUCH | SMALL | MUCH | SMALL | MUCH | SMALL |

With reference back to FIG. 1, the average value AVy of the luminance signal is calculated by the luminance average calculating unit 5. The average value AVc of the chrominance signal is calculated by the chrominance average calculating unit 6. The average value AVy of the luminance signal and the average value AVc of the chrominance signal are transmitted to the selector 8. The selector 8 receives the luminance-chrominance selecting signal from the controller 13. The selector 8 selects one of the average value AVy of the luminance signal and the average value AVc of the chrominance signal in accordance with the luminance-chrominance selecting signal that is transmitted from the controller 13. The selector 8 supplies the selected one as the average value AV to the noise reduction unit 9.

Table 5 shows a relationship between the color of the left top pixel of the pixel block and a selected one of the average value AVy of the luminance signal and the average value AVc of the chrominance signal. The luminance-chrominance selecting signal is based on the relationship of FIG. 5. When the color of the left top pixel of the pixel block is R shown in FIG. 3A, the selector 8 selects a port 8b that receives the average value AVc of the chrominance signal Cr. The selector 8 outputs the average value AVc of the chrominance signal Cr as the average value AV. When the color of the left top pixel of the pixel block is Gr shown in FIG. 3B, the selector 8 selects a port 8a that receives the average value AVy of the luminance signal Y The selector 8 outputs the average value AVy of the luminance signal Y as the average value AV. When the color of the left top pixel of the pixel block is Gb shown in FIG. 3C, the selector 8 selects the port 8a that receives the average value AVy of the luminance signal Y The selector 8 outputs the average value AVy of the luminance signal Y as the average value AV. When the color of the left top pixel of the pixel block is B shown in FIG. 3D, the selector 8 selects the port 8b that receives the average value AVc of the chrominance signal Cb. The selector 8 outputs the average value AVc of the chrominance signal Cb as the average value AV.

TABLE 5

| LEFT TOP PIXEL | AV |
|---|---|
| R | AVc(Cr AVERAGE) |
| Gr | AVy |
| Gb | AVy |
| B | AVc(Cb AVERAGE) |

The noise reduction unit 9 receives the signal of the target pixel S from the selector 4. The noise reduction unit 9 also receives the average value AV from the selector 8. The noise reduction unit 9 also receives the noise estimate value N from the noise estimation unit 7. The signal of the target pixel S, the average value AV and the noise estimate value N are shown on the following Table 6, which vary depending on the colors R (FIG. 3A), Gr (FIG. 3B), Gb (FIG. 3C), and B (FIG. 3D) of the left top pixel of the pixel block.

TABLE 6

| LEFT TOP PIXEL | TARGET PIXEL S | AVERAGE VALUE AV | ESTIMATED NOISE VALUE N |
|---|---|---|---|
| R | Cr, CENTER OF (p × q) | AVERAGE VALUE OF Cr | ESTIMATED NOISE VALUE OF Cr |
| Gr | Y, CENTER OF (p × q) | AVERAGE VALUE OF Y | ESTIMATED NOISE VALUE OF Y |
| Gb | Y, CENTER OF (p × q) | AVERAGE VALUE OF Y | ESTIMATED NOISE VALUE OF Y |
| B | Cb, CENTER OF (p × q) | AVERAGE VALUE OF Cb | ESTIMATED NOISE VALUE OF Cb |

When the color of the left top pixel of the pixel block is R, the signal of the target pixel "S" from the selector 4 is the chrominance signal Cr that is positioned at the center of the two dimensional array (p×q) of the chrominance signal data. The average value AV from the selector 8 is the average value of the chrominance signal Cr. The noise estimate value N from the noise estimation unit 7 is the noise value of the chrominance signal Cr. When the color of the left top pixel of the pixel block is Gr, the signal of the target pixel "S" from the selector 4 is the luminance signal Y that is positioned at the center of the two dimensional array (p×q) of the luminance signal data. The average value AV from the selector 8 is the average value of the luminance signal Y The noise estimate value N from the noise estimation unit 7 is the noise value of the luminance signal Y. When the color of the left top pixel of the pixel block is Gb, the signal of the target pixel "S" from the selector 4 is the luminance signal Y that is positioned at the center of the two dimensional array (p×q) of the luminance signal data. The average value AV from the selector 8 is the average value of the luminance signal Y. The noise estimate value N from the noise estimation unit 7 is the noise value of the luminance signal Y When the color of the left top pixel of the pixel block is B, the signal of the target pixel "S" from the selector 4 is the chrominance signal Cb that is positioned at the center of the two dimensional array (p×q) of the chrominance signal data. The average value AV from the selector 8 is the average value of the chrominance signal Cb. The noise estimate value N from the noise estimation unit 7 is the noise value of the chrominance signal Cb.

The noise reduction unit 9 determines whether or not the signal of the target pixel "S" is subjected to the noise reduction process. If the noise reduction unit 9 determines to perform the noise reduction process, then the noise reduction unit 9 performs the noise reduction of the signal of the target pixel "S" and outputs the noise-reduced signal Sa.

The determination is made by verifying whether the following two conditions for the target pixel "S" are satisfied.

(A) the signal level for the target pixel "S"<(the average value AV+the noise estimate value N)

(B) the signal level for the target pixel "S"<(the average value AV−the noise estimate value N)

The above two conditions include the following technical senses. Averaging a plurality of pixels forms a low pass filter that eliminates a high frequency signal. The average value AV in the right side of the above determination equation may be recognized as a noise-free signal from which a high frequency signal such as a random noise is removed. The noise estimate value N is a shot noise estimate value that is generated when the output from the image pickup element is the average signal level.

Thus, the sum of the average value AV and the noise estimate value N (AV+N) in the determination equation (A) may be recognized as an upper limit of the pixel level range when the signal of the target pixel "S" includes a noise.

If the result of the determination using the determination formula (A) is true or if the signal level for the target pixel "S" is smaller than the sum of the average value AV and the noise estimate value N, then this means that the signal of the target pixel "S" includes a shot noise component but the target pixel is positioned at a flat portion of the image.

If the result of the determination using the determination formula (A) is false or if the signal level for the target pixel "S" is larger than the sum of the average value AV and the noise estimate value N, then this means that the signal of the target pixel "S" may include the noise but the target pixel is positioned where a signal level variation is caused which is greater than the noise estimate value. Namely, the target pixel is positioned on the edge of the object.

If the result of the determination using the determination formula (B) is true or if the signal level for the target pixel "S" is smaller than the remainder of subtracting the noise estimate value N from the average value AV, then this means that the signal of the target pixel "S" includes the noise but the target pixel is positioned at the flat portion of the image.

If the result of the determination using the determination formula (B) is false or if the signal level for the target pixel "S" is larger than the remainder of subtracting the noise estimate value N from the average value AV, then this means that the signal of the target pixel "S" may include the noise but the target pixel is positioned where a signal level variation is caused which is greater than the noise estimate value. For example, the target pixel "S" is positioned at the edge of the image of the object.

A logical product "P" of the above two determination results is hereby introduced.

If the logical product "P" is true, this means that the signal of the target pixel includes the noise component and the target pixel is positioned at the flat portion of the image.

If the logical product "P" is false, this means that the signal of the target pixel includes the noise component and the target pixel is positioned on the edge of the image.

The noise reduction unit 9 selects one of the average signal and the signal of the target pixel based on the logical product "P" that is the determination result. The noise reduction unit 9 outputs the selected one.

If the logical product "P" is true, then the signal of the target pixel includes the noise component and the target pixel is positioned at the flat portion of the image. The noise reduction unit 9 selects the average value AV to reduce the noise.

If the logical product "P" is false, then the signal of the target pixel includes the noise component and the target pixel is positioned on the edge of the image. The noise reduction unit 9 selects the signal of the target pixel in order to prevent the quality of the image. Namely, the noise reduction unit 9 does not select the average signal because the selection of the average signal causes an undesired formation of the low pass filter that deteriorates the sharpness of the edge of the image.

If the logical product P is true, then the flat portion of the image includes the noise. Selecting the average signal AV reduces the noise component. Removal of the high frequency component by selecting the average signal does not cause any deterioration of the quality of the image.

If the logical product P is false, the target pixel is positioned on the edge of the image. The target pixel "S" is outputted. The high frequency component is removed. The sharpness of the edge of the image is deteriorated. The noise reduction unit 9 generates an output signal Sa that has been processed as described above.

The above described determination process realizes a correct discrimination of whether the variation of the image signal level is caused by the noise or by the variation of the level of the image signal of the object. This allows a highly accurate noise reduction process. In accordance with the present embodiment, the noise reduction unit 9 generates and outputs one of the average value signal or the target pixel signal. The configuration of the noise reduction unit 9 should not be limited to the above. The noise reduction unit 9 may be configured to reduce noises based on the previously measured characteristics of the noise of the image pickup device.

In accordance with the above example, if the target pixel is positioned on the edge of the image, then the noise reduction unit 9 selects the signal of the target pixel. If the target pixel is positioned at the flat portion of the image, then the noise reduction unit 9 selects the average value AV to reduce the noise. An output from the noise reduction unit 9 shows an abrupt variation which may cause that the image has an edge that provides an unnatural impression.

It is possible as a modification that, instead of selecting the signal of the target pixel S, if the signal level of the target pixel S is larger than the sum (AV+N) of the average value AV and the noise estimate value N, then the noise reduction unit 9 outputs the sum of the signal level for the target pixel "S" and the noise estimate value "N". Continuity between the signal level of the target pixel "S" and the signal level of the average value AV may be obtained. Namely, the signal level of the edge portion of the image is close to that of the average value AV. This ensures that the image has an edge that provides a natural impression.

The above-described process generates the noise-reduced luminance signal or the noise-reduced chrominance signal. While an RGB data area of (10×10) being moved one pixel by one pixel, the above-described process is performed to generate the noise-reduced luminance signal and the noise-reduced chrominance signal of one frame.

The noise reduction unit 9 generates the noise-reduced image data including the noise-reduced luminance signal and the noise-reduced chrominance signal. The noise-reduced image data is transmitted to the data generating unit 10. The data generating unit 10 generates a two-dimensional array of image data that includes the noise reduced luminance and chrominance signals. The two-dimensional array of noise-reduced image data is then transmitted from the data generating unit 10 to the data conversion unit 11. The data conversion unit 11 converts the two-dimensional array of noise-reduced image data into a Bayer array of R, Gr, Gb and B data.

The data generating unit 10 generates a two dimensional array (2×2) of data from the luminance chrominance signals that are inputted into the data generating unit 10 one pixel by one pixel. Namely, the data generating unit 10 generates two Y signals (Y1 and Y2) and two C signals (Cr and Cb). The data conversion unit 11 generates the noise-reduced signals for R, Gr, Gb, and B from the two Y signals and the two C signals. An inverse transform formula can be used to convert or transform the Cr signal and the Cb signal to the noise reduced signals for R, Gr, Gb, and B. The inverse transform formula may be in inverse relation to the above formula (1) that is used by the luminance-chrominance generating unit 3. For example, if the conversion or transformation is made using the formula (1), then the inverse transform formula is the following formula (2).

$$\begin{cases} R = Y_1 + 1.402 \times Cr \\ Gr = Y_1 - 0.344 \times Cb - 0.714 \times Cr \\ Gb = Y_2 - 0.344 \times Cb - 0.714 \times Cr \\ B = Y_2 + 1.772 \times Cb \end{cases} \quad (2)$$

The data conversion unit 11 selects one of the four signals, namely the Y1 signal, the Y2 signal, the Cr signal and the Cb signal. The selection is made depending on the color of the left top pixel of the pixel block in the two dimensional array (2×2) of luminance chrominance data that has been generated by the data generating unit 10. Shown on Table 7 is a relationship between the color of the left top pixel and the noise reduced RGB signal.

TABLE 7

| LEFT TOP PIXEL | NOISE-REDUCED RGB |
|---|---|
| Cr | R |
| $Y_1$ | Gr |
| $Y_2$ | Gb |
| Cb | B |

The type of the signal of the left top pixel of the pixel block (2×2) has a one-to-one correspondence to an array of the input RGB data. Thus, the luminance-chrominance selecting signal is used as the selecting signal by the data conversion unit 11 shown in FIG. 1.

FIG. 8A is a view illustrating input RGB image data that has not been subjected to the noise reduction. FIG. 8B is a view illustrating noise reduced luminance chrominance data. FIG. 8C is a view illustrating noise reduced RNG image data. The noise reduced luminance chrominance data of Y(Y1, Y2), Cr, and Cb shown in FIG. 8A can be obtained from the Bayer array of the input data R, Gr, Gb, and B shown in FIG. 8A. As shown in FIG. 8B, the array of the noise reduced luminance chrominance signals is displaced from the array of the input RGB data by a half of the pixel size in both vertical and horizontal directions. These drawings do not take into account that the image data of the edge of the image is used as null data when calculating the average calculation process.

The noise reduced luminance chrominance image data is further converted to the Bayer array of the R, Gr, Gb, B data that is displaced from the noise reduced luminance chrominance image data by a half of one pixel size in both the vertical and horizontal directions. As shown in FIG. 8C, the Bayer array of the noise reduced image data is aligned to the Bayer array of the input image data.

When the selector 12 selects the signal that is transmitted from the image pickup device 1 without performing the above described noise reduction process, the input data format of the image processing unit 14 in the follower state remains unchanged. This makes it convenient to control the noise reduction function. The image processing unit 14 performs a color correction process and a resolution compensation process.

The image processing unit 14 is configured to receive the Bayer array of the input image data. Thus, the data conversion unit 11 generates the Bayer array of the RGB data. If the image processing unit 14 is configured to receive the luminance chrominance data, then the noise reduction unit 9 supplies the noise reduced luminance chrominance (signal Sa) to the image processing unit 14.

The above described configuration performs the above described noise reduction process with an effective reduction of the noise of the luminance signal and/or the chrominance signal, while keeping the sharpness of the edge of the image of the object.

Figure 9:
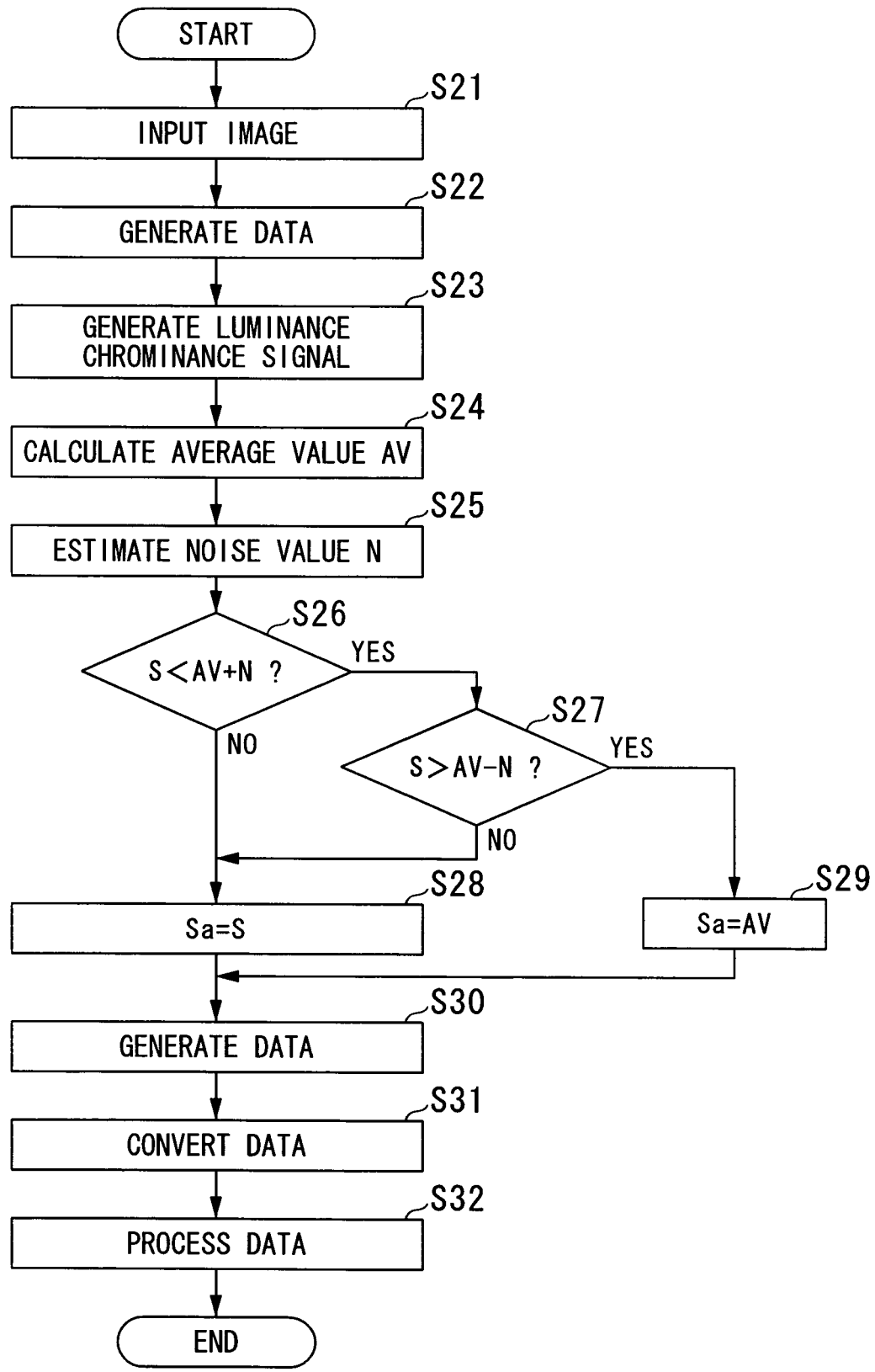
FIG. 9 is a flow chart illustrating operations of the image processing apparatus in accordance with the embodiment of the present invention.

FIG. 9 is a flow chart illustrating operations of the image processing apparatus in accordance with the embodiment of the present invention. In Step S21, the image signal is picked up by the image pickup element 1 and then inputted into the data generating unit 2. For example, the data generating unit 2 reads the digital image data. For example, if the digital image data that has been supplied by the image pickup element is stored in a memory of a computer, then the data generating unit 2 reads the image data out of the memory.

In Step S22, the data generating unit 2 generates the image data. For example, the data generating unit 2 generates the two-dimensional array of image data for the (m×n) array of pixels.

In Step S23, the luminance-chrominance generating unit 3 generates the luminance chrominance signals. For example, the luminance-chrominance generating unit 3 calculates (p×q) of the luminance signals and the chrominance signals from the two-dimensional array (m×n) of image data.

In Step S24, the luminance average calculating unit 5 and the chrominance average calculating unit 6 calculate the luminance average value and the chrominance average value, respectively. For example, the luminance average calculating unit 5 and the chrominance average calculating unit 6 calculate the average value AVy of the luminance signals and the average value AVc of the chrominance signals, respectively, by using all or part of the luminance signals and the chrominance signals for the (p×q) array of pixels. The method of the number of data sets to be used is as described above.

In Step S25, the noise estimation unit 7 estimates the noise estimate value. For example, the noise estimation unit 7 calculates the noise estimate values N of the luminance signals and the chrominance signals based on the average value AVy of the luminance signals through the above-described processes.

In Step S26, the noise reduction unit 9 performs a first determination on whether or not the signal of the target pixel "S" should be subjected to the noise reduction so that the noise reduction unit 9 outputs the noise-reduced signal Sa. For example, the noise reduction unit 9 determines whether or not the signal level of the target pixel "S" is smaller than the sum of the average value AV and the noise estimate value N. If the signal of the target pixel "S" is the luminance signal, then the average value AV is the average value AVy of the luminance signals. If the signal of the target pixel "S" is the chrominance signal, then the average value AV is the average value AVc of the chrominance signals.

If the determination result is "Yes" or the signal level of the target pixel "S" is smaller than the sum of the average value AV and the noise estimate value N, then the process enters into Step S27. If the determination result is "No" or the signal level of the target pixel "S" is higher than the sum of the average value AV and the noise estimate value N, then the process enters into Step S28, in which the noise reduction unit 9 outputs the signal of the target pixel "S" as the noise reduced signal Sa.

In Step S27, the noise reduction unit 9 performs a second determination on whether or not the signal of the target pixel "S" should be subjected to the noise reduction so that the noise reduction unit 9 outputs the noise-reduced signal Sa. For example, the noise reduction unit 9 determines whether or not the signal level of the target pixel "S" is greater than the remainder of subtracting the noise estimate value N from the average value AV. If the determination result is "Yes" or the signal level of the target pixel "S" is greater than the remainder of subtracting the noise estimate value N from the average value AV, then this means that the signal level of the target pixel "S" is not only greater than the remainder of subtracting the noise estimate value N from the average value AV but also smaller than the sum of the average value AV and the noise estimate value N. The noise reduction unit 9 determines that the target pixel "S" is not positioned on the edge of the image and then in Step S29, the noise reduction unit 9 outputs the average value AV as the noise reduced signal Sa.

If the determination result is "No" or the signal level of the target pixel "S" is smaller than the remainder of subtracting the noise estimate value N from the average value AV, then the noise reduction unit 9 determines that the target pixel "S" is positioned on the edge of the image. Then, in Step S28 the noise reduction unit 9 outputs the signal of the target pixel S as the noise reduced signal Sa.

In Step S30, the data generating unit 10 generates a two dimensional array of image data of the noise reduced luminance chrominance signals. For example, the data generating unit 10 generates a two dimensional array (2×2) of data, namely two Y signals (Y1 and Y2) and two C signals (Cr and Cb) from the luminance chrominance signals that are inputted one pixel by one pixel.

In Step S31, the data conversion unit 11 performs the data conversion. For example, the data conversion unit 11 converts or transforms the two dimensional array of image data of the noise reduced luminance chrominance signals into the signals in the color space that is the same as that of the input image data.

In Step S32, the image processing unit 14 performs the other image processes such as the color correction process and the resolution compensation process.

The above described processes can be carried out by executing a machine-readable or computer-readable software program.

Figure 10:
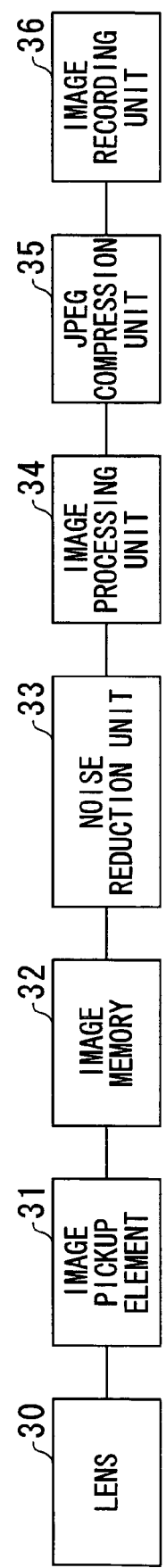
FIG. 10 is a block diagram illustrating an example of a configuration of an electronic camera that integrates the image processing apparatus of the present invention.

FIG. 10 is a block diagram illustrating an example of a configuration of an electronic camera that integrates the image processing apparatus of the present invention. In FIG. 10, the electronic camera may include a lens 30, an image pickup element 31, an image memory 32, a noise reduction unit 33, an image processing unit 34, a JPEG compression unit 35, and an image recording unit 36. The image memory 32 stores the image data that has been picked up by the image pickup element 31. The noise reduction unit 33 reduces the noise of the image data that is transmitted from the image pickup device 31. The noise reduction unit 33 can be realized by the above-described noise reduction apparatus 15. The image processing unit 34 performs the other image processing than the noise reduction processes. For example, the image processing unit 34 receives the noise-reduced image data from the noise reduction unit 33 so that the image processing unit 34 performs the color correction, the brightness correction and the resolution compensation to the noise-reduced image data. The JPEG compression unit 35 receives the image data from the image processing unit 34. The JPEG compression unit 35 performs a JPEG (Joint Photograph Experts Group) compression of the received image data. The image recording unit 36 receives the compressed image data from the PEG compression unit 35 and stores the same in a recording medium such as a memory card.

Operations of the electronic camera shown in FIG. 10 will be described. An image of an object is transmitted through the lens 30 and focused on the image pickup element 31. The image is subjected to an optoelectronic conversion and an analog-to-digital conversion that are performed by the image pickup element 31, thereby generating digital image data. The image data is then stored in the image memory 32. The image data is then read out of the image memory 32 and then transmitted to the noise reduction unit 33. The noise reduction unit 33 is realized by the noise reduction unit 15 shown in FIG. 1. The noise reduction unit 33 performs the above described noise reduction process. The image data is then transmitted from the noise reduction unit 33 to the image processing unit 34 so that the image data is subjected to the above-described image processing by the image processing unit 34. The image data is then compressed by the JPEG compression unit 35. The compressed image data is then stored by the image recording unit 36. The above configuration can realize the electronic camera that generates the noise-reduced high quality image.

Figure 11:
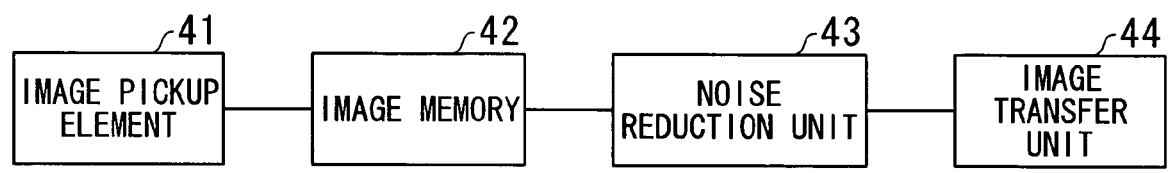
FIG. 11 is a block diagram illustrating an example of a configuration of a scanner that integrates an image processing apparatus in accordance with the present invention.

FIG. 11 is a block diagram illustrating an example of a configuration of a scanner that integrates the image processing apparatus in accordance with the present invention. In FIG. 11, the scanner may include an image pickup element 41 with an alignment of pixels in a direction, an image memory 42, a noise reduction unit 43, and an image transfer unit 44. The image memory 42 stores the image data that has been picked up by the image pickup element 41. The noise reduction unit 43 performs the noise reduction of the image data that is transmitted from the image pickup device 41. The image transfer unit 44 receives the noise reduced image data from the noise reduction unit 43 and transfers the noise reduced image data to the outside.

Operations of the scanner shown in FIG. 11 will be described. The image pickup element 41 is moved in a direction to scan the image data. The scanned image data is then subjected to the analog-to-digital conversion to generate digital image data. The digital image data is then stored in the image memory 42. The image data is read out of the image memory 42 and then transmitted to the noise reduction unit 43. The noise reduction unit 43 can be realized by the noise reduction unit 15 shown in FIG. 1. The noise reduction unit 43 performs the above described noise reduction process. The noise reduced image data is transferred from the noise reduction unit 43 through the image transfer unit 44 to the outside.

The above configuration can realize the scanner that generates the noise reduced high quality image.

The present invention is applicable to a wide variety of electronic equipments that include or use an image pickup element that picks up image data, wherein noise reduced image data is generated.

The term "unit" is used to describe a component, section or part of a device, and includes, but is not limited to, hardware and/or software that is constructed and/or programmed to carry out the desired function.

The term "target pixel" is used to describe a pixel that is now being subjected to the noise reduction process that reduces a luminance noise and a chrominance noise separately one pixel by one pixel.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image processing apparatus performing a noise reduction one pixel by one pixel, the image processing apparatus comprising:
   a data generating unit that generates a two dimensional array of image data based on input image data, the two dimensional array of image data being allocated to a first set of pixels that includes a target pixel, the input image data being supplied one pixel by one pixel from an image pickup element;
   a luminance-chrominance generating unit that generates a plurality of luminance signals and a plurality of chrominance signals based on the two dimensional array of image data;
   a luminance average calculating unit that calculates, based on the plurality of luminance signals, an average of luminance signals that are allocated to a second set of pixels including the target pixel, the second set of pixels being included in the first set of pixels;
   a chrominance average calculating unit that calculates, based on the plurality of chrominance signals, an average of chrominance signals that are allocated to a third set of pixels including the target pixel, the third set of pixels being included in the first set of pixels;
   a noise estimation unit that generates at least one of a luminance noise estimate value and a chrominance noise estimate value in accordance with the average of luminance signals, the luminance noise estimate value estimating a luminance noise of the target pixel, the chrominance noise estimate value estimating a chrominance noise of the target pixel; and
   a noise reduction unit that performs a noise reduction to the target pixel based on one of first and second sets of information, the first set of information including the average of luminance signals and the luminance noise estimate value, the second set of information including the average of chrominance signals and the chrominance noise estimate value.

2. The image processing apparatus according to claim 1, wherein the noise estimation unit further comprises:
   a memory that stores a first relationship between the average of luminance signals and the luminance noise estimate value and a second relationship between the average of chrominance signals and the chrominance noise estimate value, and the first and second relationships being defined for the image pickup element.

3. The image processing apparatus according to claim 1, wherein the noise estimation unit further comprises:
   a register that stores a first correspondence between the luminance noise estimate value and the average of luminance signals, and a second correspondence between the chrominance noise estimate value and the average of chrominance signals, the first and second correspondences being defined for the image pickup element; and a linear approximation operation unit that performs, as a linear approximation, a linear interpolation operation of at least one of the luminance noise estimate value and the chrominance noise estimate value, the luminance noise estimate value and the chrominance noise estimate value being stored in the register.

4. The image processing apparatus according to claim 1, wherein the noise estimation unit is adapted to perform corrections to the chrominance noise estimate value and the chrominance noise estimate value based on at least one of a temperature of the image pickup element, an exposure time related to the image pickup element, and a gain against a signal from the image pickup element.

5. The image processing apparatus according to claim 1, further comprising:
a data conversion unit that converts a first format of output image data into a second format that is the same as that of the input image data, the output image data being an output from the noise reduction unit.

6. An image processing method for performing a noise reduction one pixel by one pixel, the image processing method comprising:
generating a two dimensional array of image data based on input image data, the two dimensional array of image data being allocated to a first set of pixels that includes a target pixel, the input image data being supplied one pixel by one pixel from an image pickup element;
generating a plurality of luminance signals and a plurality of chrominance signals based on the two dimensional array of image data;
calculating, based on the plurality of luminance signals, an average of luminance signals that are allocated to a second set of pixels including the target pixel, the second set of pixels being included in the first set of pixels;
calculating, based on the plurality of chrominance signals, an average of chrominance signals that are allocated to a third set of pixels including the target pixel, the third set of pixels being included in the first set of pixels;
generating at least one of a luminance noise estimate value and a chrominance noise estimate value in accordance with the average of luminance signals, the luminance noise estimate value estimating a luminance noise of the target pixel, the chrominance noise estimate value estimating a chrominance noise of the target pixel; and
performing a noise reduction to the target pixel based on one of first and second sets of information, the first set of information including the average of luminance signals and the luminance noise estimate value, the second set of information including the average of chrominance signals and the chrominance noise estimate value.

7. The image processing method according to claim 6, wherein generating at least one of the luminance noise estimate value and the chrominance noise estimate value further comprises:
referring a first relationship between the average of luminance signals and the luminance noise estimate value and a second relationship between the average of chrominance signals and the chrominance noise estimate value, and the first and second relationships being defined for the image pickup element.

8. The image processing method according to claim 6, wherein generating at least one of the luminance noise estimate value and the chrominance noise estimate value further comprises:
recognizing a first correspondence between the luminance noise estimate value and the average of luminance signals, and a second correspondence between the chrominance noise estimate value and the average of chrominance signals, the first and second correspondences being defined for the image pickup element; and
performing, as a linear approximation, a linear interpolation operation of at least one of the luminance noise estimate value and the chrominance noise estimate value.

9. The image processing method according to claim 6, wherein generating at least one of the luminance noise estimate value and the chrominance noise estimate value further comprises:
performing corrections to the chrominance noise estimate value and the chrominance noise estimate value based on at least one of a temperature of the image pickup element, an exposure time related to the image pickup element, and a gain against a signal from the image pickup element.

10. The image processing method according to claim 6, further comprising:
converting a first format of output image data into a second format that is the same as that of the input image data, the output image data being obtained by performing the noise reduction.

11. An electronic device comprising:
an image pickup element;
a data generating unit that generates a two dimensional array of image data based on input image data, the two dimensional array of image data being allocated to a first set of pixels that includes a target pixel, the input image data being supplied one pixel by one pixel from the image pickup element;
a luminance-chrominance generating unit that generates a plurality of luminance signals and a plurality of chrominance signals based on the two dimensional array of image data;
a luminance average calculating unit that calculates, based on the plurality of luminance signals, an average of luminance signals that are allocated to a second set of pixels including the target pixel, the second set of pixels being included in the first set of pixels;
a chrominance average calculating unit that calculates, based on the plurality of chrominance signals, an average of chrominance signals that are allocated to a third set of pixels including the target pixel, the third set of pixels being included in the first set of pixels;
a noise estimation unit that generates at least one of a luminance noise estimate value and a chrominance noise estimate value in accordance with the average of luminance signals, the luminance noise estimate value estimating a luminance noise of the target pixel, the chrominance noise estimate value estimating a chrominance noise of the target pixel;
a noise reduction unit that performs a noise reduction to the target pixel based on one of first and second sets of information, the first set of information including the average of luminance signals and the luminance noise estimate value, the second set of information including the average of chrominance signals and the chrominance noise estimate value; and
an output unit that converts a first format of output signal into a second format that is different from the first format, the output signal being an output from the noise reduction unit.

12. The electronic device according to claim 11, wherein the electronic device comprises an electronic camera.

13. The electronic device according to claim 11, wherein the electronic device comprises a scanner.

* * * * *